March 1, 1966  T. B. BISSETT  3,238,526
APPARATUS FOR REMOTE FLASH PHOTOGRAPHY
Filed March 15, 1962
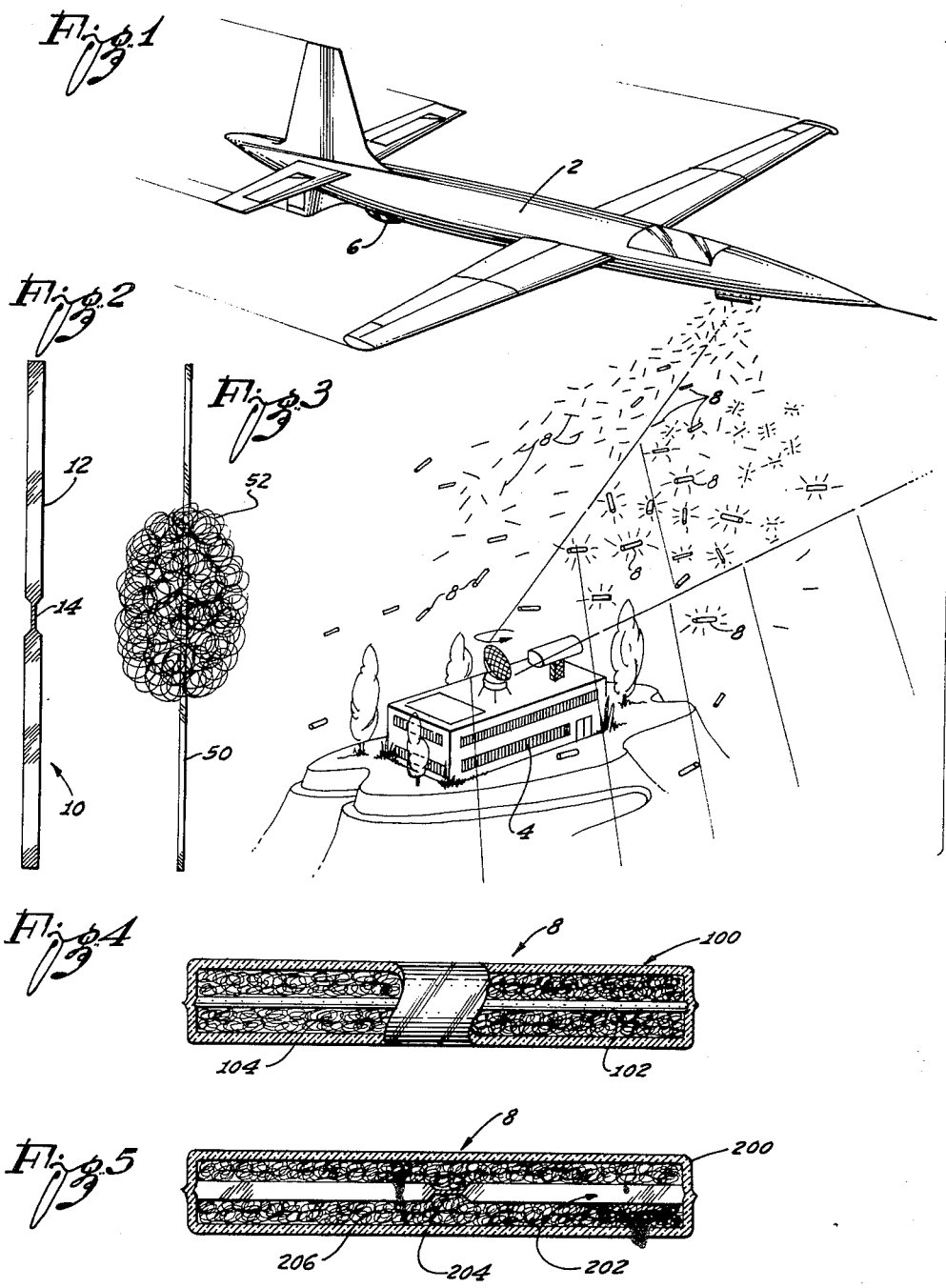
INVENTOR:
Thomas B. Bissett
Attorneys

United States Patent Office 3,238,526
Patented Mar. 1, 1966

3,238,526
APPARATUS FOR REMOTE FLASH PHOTOGRAPHY
Thomas B. Bissett, Malibu, Calif., assignor to The Bissett-Berman Corporation, Santa Monica, Calif., a corporation of California
Filed Mar. 15, 1962, Ser. No. 179,885
5 Claims. (Cl. 343—5)

This invention relates to a method of photography utilizing remote flash apparatus. The invention also relates to a flash means which is triggered by energy directed at the flash means through space on a wireless basis. The invention is particularly directed to a method of photographing a ground installation such as a radar station in the nighttime by utilizing aerial photography wherein the photograph provides information about the radar station such as power output, scan rate and beamwidth.

It is often desirable when photographing a subject to use illuminating flash means located close to the subject. It would be valuable to trigger the flash means by a central supply means without the use of interconnecting wires. For example, it would be desirable to aerially photograph ground radar installations at night to prevent strangers from visibly observing the photographing aircraft. If the photography is to be done at night, some means must be provided of illuminating the radar installation. Also, the aircraft should fly as high as possible to hinder any retaliatory practices by third parties in the area.

There are many possible ways to try to illuminate the radar installation. For example, flash means could be located on the plane; however, since the plane should be flying at a high altitude, the flash would be too high to illuminate the ground installation. Also, strangers in the area could utilize the flash on the plane as a means of visibly locating the aircraft for retaliatory practices.

Another method of illumination would be to utilize flares thrown from the plane. These flares would burn as they float downward on small parachutes toward the ground installation. However, since the flares would burn for a long period of time, they would enable strangers in the area to retaliate against the airplane before the aerial photographs could be taken. Moreover, the flares would indiscriminately provide illumination and would not provide any information as to the power, antenna scan rate and beamwidth of the radar installation.

It is, therefore, desirable to utilize illuminating means which flash only for a brief instant and at a low altitude sufficient to illuminate the radar installation. The aircraft is located at a high altitude and the flash means illuminate the radar installation to enable the aircraft to take aerial photographs.

As a specific illustration, the invention is concerned with a method of night aerial photography utilizing an automatically ignited flash means. The flash apparatus is triggered at an altitude sufficient to illuminate the radar installation by utilizing radar signals from the radar installation. The invention is also concerned with flash apparatus which operates in the above method.

The apparatus consists of a strip of ignitable material having a length to operate as an antenna element for the reception of radar signals transmitted by the radar installation. The antenna element may have a fuse section of a smaller cross-sectional area to control the point of ignition of the antenna element. Additional combustible material may surround the antenna element to burn and provide increased light upon the ignition of the antenna element. Also, the antenna element and additional combustible material may be disposed within a sealed envelope containing oxygen to burn with an intense light.

The range from the radar device at which the antenna element ignites is controlled by the cross-sectional area of the fuse element and the radar power. Since the element is composed of a readily combustible material such as zirconium, current flows in the antenna element upon the reception of radar signals. This current heats the fuse section and ignites it. The heat generated in the antenna element is proportional to the resistance of the antenna element and the square of the current through the element.

When the photographic subject is a radar station, the energy from the radar signals transmitted by the station may be used to ignite the flash apparatus. Since the signal strength of the signal varies inversely with the square of the distance from the radar station, the cross-sectional area of the fuse section in combination with the signal strength determines the range at which the flash apparatus operates. At a particular range, the signal strength is great enough to produce a sufficient current to ignite the fuse element. The fuse element cannot become ignited before reaching the proper range because of the proportionate relationship between the heat generated in the antenna element and the square of the current through the element. The ignition of the fuse element ignites any additional material surrounding the fuse element so as to provide the illumination.

Since many of the flash elements are ejected from the aircraft, they scatter and cover a large area. The flash elements intercepted by the beam of energy from the radar station are ignited. If the beam rotates, a circular pattern of flashes will occur.

Since the pattern of light recorded by the photograph or photographs gives sufficient information as to the operation of the radar station, it is not necessary to actually illuminate the radar station. However, if it is also desirable to photograph the radar station ground equipment, the quantity of flash elements and their illuminating properties are chosen to provide sufficient light to enable the camera to photograph the ground equipment.

In the drawings:
FIGURE 1 shows the general operation of the system as practiced by the invention;
FIGURE 2 shows one embodiment of the automatically controlled flash mechanism;
FIGURE 3 shows a second embodiment of the flash mechanism;
FIGURE 4 shows a third embodiment of the automatically controlled flash mechanism; and
FIGURE 5 shows a fourth embodiment of the flash mechanism.

In FIGURE 1, a reconnaissance aerial-photography aircraft 2 is illustrated. The aircraft 2 may be flying at night over a ground installation 4 such as a radar station to take photographs of the ground installation by using camera equipment 6 located on the aircraft. Automatically responsive radar-controlled flash mechanisms 8 are shown as igniting when intercepted by the radar beam to allow the camera equipment in the aircraft to photograph the ground installation or the location of the individual flashes.

If the only information desired relates to the electrical characteristics of the radar station, it is only necessary to photograph the flashes of light from the flash mechanisms 8. The pattern of flashes recorded by the photographs and the methods of photography can provide information as to the power of the radar station and the beamwidth, scanning rate and scanning arc of the radar beam.

If the radar beam from the radar station scans in a complete circle, a photograph, if taken over a relatively long time period where the flash mechanisms blanket the entire area, shows a circular area of many bright spots of light. Since the range at which the flash mechanisms ignite is dependent upon the power of the radar beam, the radius of the circular area is also dependent upon the power of the radar beam. This can be calibrated so as to use the photograph to determine the radar power. It will be appreciated that a series of photographs rather than a single photograph can be taken to provide the information described above.

If the radar beam does not scan a complete circle, the scanning arc shows up as a pie-shaped pattern on the photograph. In the same manner as above, it is possible to determine the power of the radar station.

The beamwidth is determined by taking a photograph with the camera set with a relatively fast shutter speed. This captures an instantaneous position of the radar beam with the flashes of light showing up as a pie-shaped pattern. The beamwidth is equal to the angle subtended by the radial sides of the pie-shaped pattern.

The scanning rate of the radar station can be determined by taking successive photographs having a predetermined time relationship. The change in the angular position of the pattern recorded by the photographs in combination with the time period between the taking of the successive photographs is used to determine the scanning rate.

FIGURE 2 shows a first embodiment of a flash mechanism 10. The flash mechanism 10 is composed of an ignitable strip of material 12 such as zirconium which acts as an antenna element. The total length of the strip of ignitable material 12 is equal to or greater than a half wavelength of the frequency of operation of the radar station of interest. Fuse section 14 is disposed in the antenna element 12 to ignite the antenna element since it has a decreased cross-sectional area and consequently an increased resistance.

As the flash mechanisms 10 are dropped in an area where radars are known to operate, they become progressively responsive to a radar beam as they fall. The resultant current flowing in the flash mechanisms 10 is proportional in intensity to the intensity of the magnetic field of the radar beam and to the distance of the flash mechanisms from the radar beam.

Since the flash mechanisms 10 have resistive losses as a result of the flow of current, energy is dissipated in the flash mechanisms so that the temperature of the mechanisms increases. Because of its relatively high resistance, the fuse section 14 reaches the ignition temperature first and the flash mechanism 10 commences to burn, thereby forming an oxide of the metal in combination with the oxygen in the air. It will be appreciated that the entire flash mechanism 10 can have the same cross-sectional area, and the fuse section would, therefore, be the entire length of the wire.

FIGURE 3 shows a flash mechanism similar to FIGURE 2, but having additional combustible material to increase the light output from the flash mechanism. The antenna element and the fuse section are shown to be an integral member 50 having a constant cross-sectional area. A wad of additional combustible material 52, which may also be composed of zirconium, surrounds the member 50. Upon the ignition of the member 50, the entire wad of combustible material also commences to burn so as to provide an increased light output.

FIGURE 4 shows a third embodiment of the flash mechanism. An envelope 100, preferably composed of glass or some other material which is permeable to radar signals, is sealed at both ends and is filled with a combustion-supporting material such as oxygen. Disposed within the envelope 100 is a strip 102 of ignitable material such as zirconium. The strip 102 of material is designed to act as a radar antenna to receive signals transmitted by the ground installation. The strips 102 are provided with lengths related to the frequency of the radar signals so as to facilitate their operation as antennas in receiving the radar signals.

The radar signals received by the strips 102 develop currents in the strips to ignite the strips when the currents reach a sufficient value. The signal strength of the transmitted signal and the cross-sectional area of the strips 102 constitute parameters which control the range at which the strips 102 ignite in the same manner as in the operation of the embodiments of FIGURES 2 and 3.

Combustible material 104 is also disposed within the glass envelope around the strip 102. Upon the ignition of the strip 102, the combustible material 104 burns to create an intense light. The combustible material 104 may also have a suitable composition such as zirconium.

FIGURE 5 illustrates a fourth embodiment of the flash mechanism. A sealed envelope 200 is shown which is similar to the envelope 100 of FIGURE 4. Within the glass envelope 200 is a material such as oxygen which will support combustion of the elements in the envelope 200. A strip 202 composed of an ignitable material such as zirconium is again provided with a proper length to act as a radar antenna for receiving transmitted radar signals. The strip 202 is provided with a fuse section 204 of restricted cross-sectional area at an intermediate position along the length of the strip, in the same manner as the embodiment of FIGURE 2.

The cross-sectional area of the fuse section 204 is chosen so that the fuse section will ignite upon the flow of a current of particular magnitude through the strip 202. The fuse section 204 operates to control the ignition at a localized place along the strip 202. Upon the ignition of the fuse section 204, combustible material 206 burns to give an intense illumination and allow the camera equipment on the aircraft to photograph the ground installation or the burning itself.

As in the embodiments shown in FIGURES 2, 3 and 4, the ignition of the flash mechanism shown in FIGURE 5 is delayed until the flash mechanism descends to a particular range from the radar installation 4. This is controlled by the cross-sectional area of the fuse section 204, since a sufficient signal strength from the ground installation is necessary to ignite the flash mechanism.

The above embodiments are merely illustrative of the concepts of this invention and it will be apparent to one skilled in the art that other variations may be practiced within the scope of the invention. For example, the flash apparatus can emit infrared energy rather than visible light. This is accomplished in the embodiments of FIGURES 4 and 5 by using a red tinted glass envelope which passes only the infrared energy. The camera is equipped with an infrared filter to be responsive only to infrared energy. This allows night photographs to be taken without the production of visible light as a further means of masking the photography process.

Also, in commercial or home photography, it is often desired to use remote flash units. The flash units of the present invention are particularly adapted for such use. They are light weight and completely portable since they need no wires for power. The flash units are ignited by a transmitter located by the camera equipment. The invention can also be practiced with the use of energy contained in frequency bands other than the radar band as long as the antenna element within the flash unit is responsive to those other bands of frequency.

The invention is, therefore, to be limited only by the following claims:

1. A method of aerial night photography of a ground radar installation, including the steps of,
   positioning the aircraft over the radar installation,
   releasing from the aircraft illuminating flash means to fall toward the radar installation,
   triggering the flash means in response to radar signals sent out by the ground radar installation to provide illumination, and
   triggering the photographic equipment in response to the illumination provided by the flash means.

2. The method set forth in claim 1 and additionally including the step of taking a single photograph over a relatively long time period to indicate the scan characteristics and the radar power of the ground radar installation.

3. The method set forth in claim 1 and additionally including the step of taking a sequence of photographs with a particular time relationship to indicate the scanning rate of the ground radar installation.

4. The method set forth in claim 1 and additionally including the step of taking a single photograph at a relatively fast speed to indicate the width of the radar beam from the ground radar installation.

5. A method of aerial night photography from an aircraft of a ground radar installation, including the steps of
providing radar-controlled flash means having an antenna element constructed to receive radar signals from the ground installation,
releasing the radar-controlled flash means from the aircraft as the aircraft is flying over the radar installation to have the radar-controlled flash means fall toward the ground radar installation,
receiving radar signals by the radar-controlled flash means to generate heat in the flash means and with the amount of heat dependent upon the strength of the radar signals,
igniting the radar-controlled flash means in response to a particular level of the generated heat to provide illumination, and
triggering the photographic equipment in response to the illumination provided by the flash means.

References Cited by the Examiner
UNITED STATES PATENTS

| | | |
|---|---|---|
| 2,813,411 | 11/1957 | Johnson. |
| 2,895,393 | 7/1959 | Goddard _____ 240—1.3 X |
| 2,913,892 | 11/1959 | Fritz et al. |
| 2,982,119 | 5/1961 | Anderson. |

CHESTER L. JUSTUS, *Primary Examiner.*

KATHLEEN H. CLAFFY, *Examiner.*